(12) United States Patent
Wigdahl et al.

(10) Patent No.: US 6,701,701 B2
(45) Date of Patent: Mar. 9, 2004

(54) DUCT SUPPORT AND TRANSITION STRUCTURE FOR A HARVESTER

(75) Inventors: Jeffrey Scott Wigdahl, Ames, IA (US); Timothy Arthur Deutsch, Newton, IA (US); Michael Lee Pearson, Ankeny, IA (US); Gary Lynn Warnsholz, Des Moines, IA (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 09/987,242

(22) Filed: Nov. 13, 2001

(65) Prior Publication Data

US 2003/0089095 A1 May 15, 2003

(51) Int. Cl.$^7$ ................................................ A01D 46/08
(52) U.S. Cl. ............................... 56/28; 56/202; 56/16.6
(58) Field of Search ............................... 56/28, 33, 36, 56/12.8, 13.3, 16.4 R, 16.6, 202, 203, 204, 205, 206

(56) References Cited

U.S. PATENT DOCUMENTS

| | | | |
|---|---|---|---|
| 2,862,342 A | * 12/1958 | Fergason | 56/16.6 |
| 3,552,105 A | * 1/1971 | Graham | 56/16.6 |
| 3,568,418 A | 3/1971 | Copley et al. | 56/12 |
| 4,520,617 A | * 6/1985 | Fachini et al. | 56/16.6 |
| 4,606,177 A | 8/1986 | Schlueter | 56/30 |
| 4,930,297 A | 6/1990 | Schlueter et al. | 56/16.6 |
| 4,974,401 A | * 12/1990 | Deutsch | 56/28 |
| 4,996,831 A | 3/1991 | Pearson et al. | 56/16.6 |
| 5,088,274 A | * 2/1992 | Garter et al. | 56/30 |
| 5,407,390 A | 4/1995 | Carney et al. | 460/119 |
| 5,616,077 A | * 4/1997 | Covington et al. | 56/16.6 |
| 5,857,908 A | 1/1999 | Snyder et al. | 460/115 |
| 6,018,938 A | * 2/2000 | Deutsch et al. | 56/32 |
| 6,089,006 A | * 7/2000 | Langford et al. | 56/202 |

* cited by examiner

*Primary Examiner*—Thomas B. Will
*Assistant Examiner*—Nathan Mammen

(57) ABSTRACT

A duct support and transition structure for the air system of a cotton harvester includes a plurality of upright telescoping duct sections connected to a vertically adjustable support tube extending transversely between the sections providing lateral support for the ducts. Hydraulically operated slide structure connected to the support tube moves the sections vertically between operating and transport positions and eliminates duct binding problems. A telescoping harvester basket supports forwardly extending hood structure. The hood structure opens downwardly towards the upper ducts and includes grates for exhausting air and debris. The ends of the ducts open upwardly rather than rearwardly into the hood structure. The basket can move to and from the dump position without interference from the ducts, and the hood structure reduces cotton loss without need for side shields.

22 Claims, 4 Drawing Sheets

DUCT SUPPORT AND TRANSITION STRUCTURE FOR A HARVESTER

BACKGROUND OF THE INVENTION

1. Field of the Invention

The present invention relates generally to harvesters and, more specifically, to duct support structure and duct transition structure located between the outlets of the ducts and the crop receptacle inlet.

2. Related Art

Harvesters such as cotton pickers and cotton strippers include upright cotton conveying ducts directing cotton from the harvesting structure upwardly and rearwardly into a telescoping basket or receptacle. Many of the current harvesters have fixed ducts with upper ends opening rearwardly into an upper forwardly opening area of the basket. One problem with such a fixed arrangement is cotton loss resulting from the offset between the basket opening and the ducts. The offset, which can be twelve inches or more, is required to provide clearance so the basket can be raised for dumping. As cotton escapes from the offset area, a build-up typically occurs on different parts of the harvester, including the operator access platform, and the build-up has to be manually removed from time to time.

Some presently available conveying systems require flip-out shields to minimize the effect of side winds acting on the cotton as it travels between the duct outlets and the basket opening. As many as six or more shields must be manually folded out of the way when the basket is telescoped downwardly for transport and then manually extended after the basket is raised to the normal operating position. The shields are prone to damage and often have to be replaced.

Although various types of collapsible duct arrangements have been proposed, most have one or more problems. Such problems include cotton path space limitations adjacent the duct outlet, particularly in the rearwardly curved area of the duct which directs the cotton towards the basket opening. Also, lack of adequate exhausting of dirt and debris is a frequent problem caused in part by limited space in the transition zone between the basket opening and outlet.

Structures such as shown in U.S. Pat. No. 5,857,908 include upper duct portions that pivot about a horizontal axis when the basket is lowered. Pivoting structure reduces transport height of the ducts but adds cost and complexity to the structure. Often, movable upper duct sections require a considerable amount of time and labor to move between transport and field working positions. Some presently available systems utilize chains connected to a duct support tube for raising and lowering the ducts. However, if the ducts bind for any reason, the operator must manually force the duct downwardly If the operator fails to disconnect the chains, they will break the first time the basket is moved to the dump position.

BRIEF DESCRIPTION OF THE INVENTION

It is therefore an object of the present invention to provide an improved duct support and duct transition structure for a harvester which overcomes most or all of the aforementioned problems.

It is a further object to provide duct support and duct transition structure which facilitates movement of the basket away from the upper portions of the ducts towards a dump position and downward movement of the ducts to a lowered transport position. It is another object to provide such a structure having telescoping upper duct sections which are quickly and easily movable generally linearly in unison with cylinder structure. It is a further object to provide such a structure which eliminates duct binding problems and provides good lateral support for the ducts.

It is another object to provide an improved duct support and transition structure which eliminates the need for manually adjusted shields and which reduces cotton loss and cotton build-up on the machine as compared with at least most previously available support and transition structures. It is a further object to provide such a structure which substantially reduces the number of steps and amount of time and labor necessary to move the basket and ducts between extended field working positions and retracted transport positions.

It is another object of the invention to provide an improved duct support and transition structure which improves cotton flow to the basket and reduces cotton loss between the ducts and the basket. It is a further object to provide such a structure having improved cotton flow and debris removal. It is still another object to provide such a structure having increased grate area for better air and debris exhaust and cotton flow characteristics. It is yet another object to provide such structure in combination with a multi-sectioned telescoping basket having improved capacity, cotton flow and transport configuration.

Accordingly, a duct support and transition structure includes a plurality of upright upper ducts connected to a vertically adjustable support tube extending transversely between the ducts. Vertical slide structure connected to hydraulic cylinders moves the support tube and upper ducts which telescope relative to lower ducts extending upwardly from harvester row units. A telescoping harvester basket includes hood structure which projects forwardly from the forward end of an upper basket lid extension and opens downwardly towards the upper ducts. The ends of the ducts open upwardly into the hood structure so the basket can move to and from the dump position without interference with the ducts. The upper ducts are easily retracted to a lowered transport position by retracting the cylinders to slide the support tube downwardly. The duct support provides lateral stability and eliminates most duct binding problems that otherwise would require a manual fix.

The upper ducts open upwardly into the hood structure which directs cotton flow rearwardly into the uppermost portion basket. The top portion of the hood includes panel and grate structure which extends generally the entire width of the hood and the basket for exhausting air and debris from the cotton flow stream. The extensive hood structure reduces cotton loss without need for separate side shields while facilitating quick and easy transition between basket harvest and dump positions and duct raised and duct lowered positions. The grate area is increased, and flow and debris removal characteristics are enhanced. The basket forward opening and the hood structure extend across a substantial portion of the width of the basket and provide generally unrestricted crop flow between the upper end portions and the receptacle opening through a cross-sectional area greater than a combined cross-sectional of the upwardly opening outlets in the upper ducts.

Folding or flip-out shields and duct support chains, which in the past have been the subject of damage, binding and repair problems, are eliminated. The procedure for raising and lowering the ducts is substantially simplified compared to at least most previously available structures.

These and other objects, features and advantages of the present invention will become apparent to one skilled in the

DETAILED DESCRIPTION OF THE DRAWINGS

Figure 1:
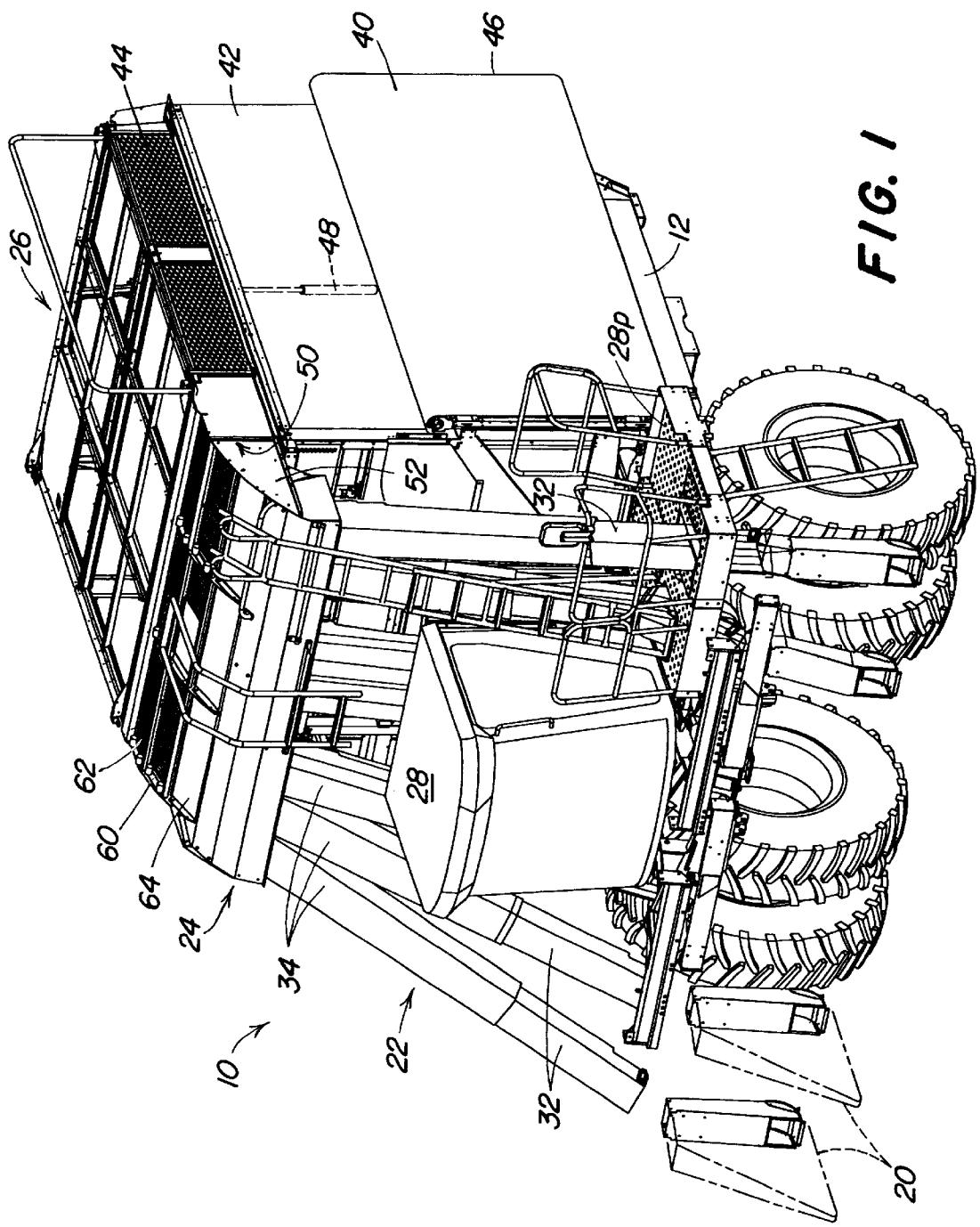
FIG. 1 is a perspective view of the front portion of a cotton harvester with the duct support and transition structure of the present invention attached thereto and with the basket in the field working position.
Figure 2:
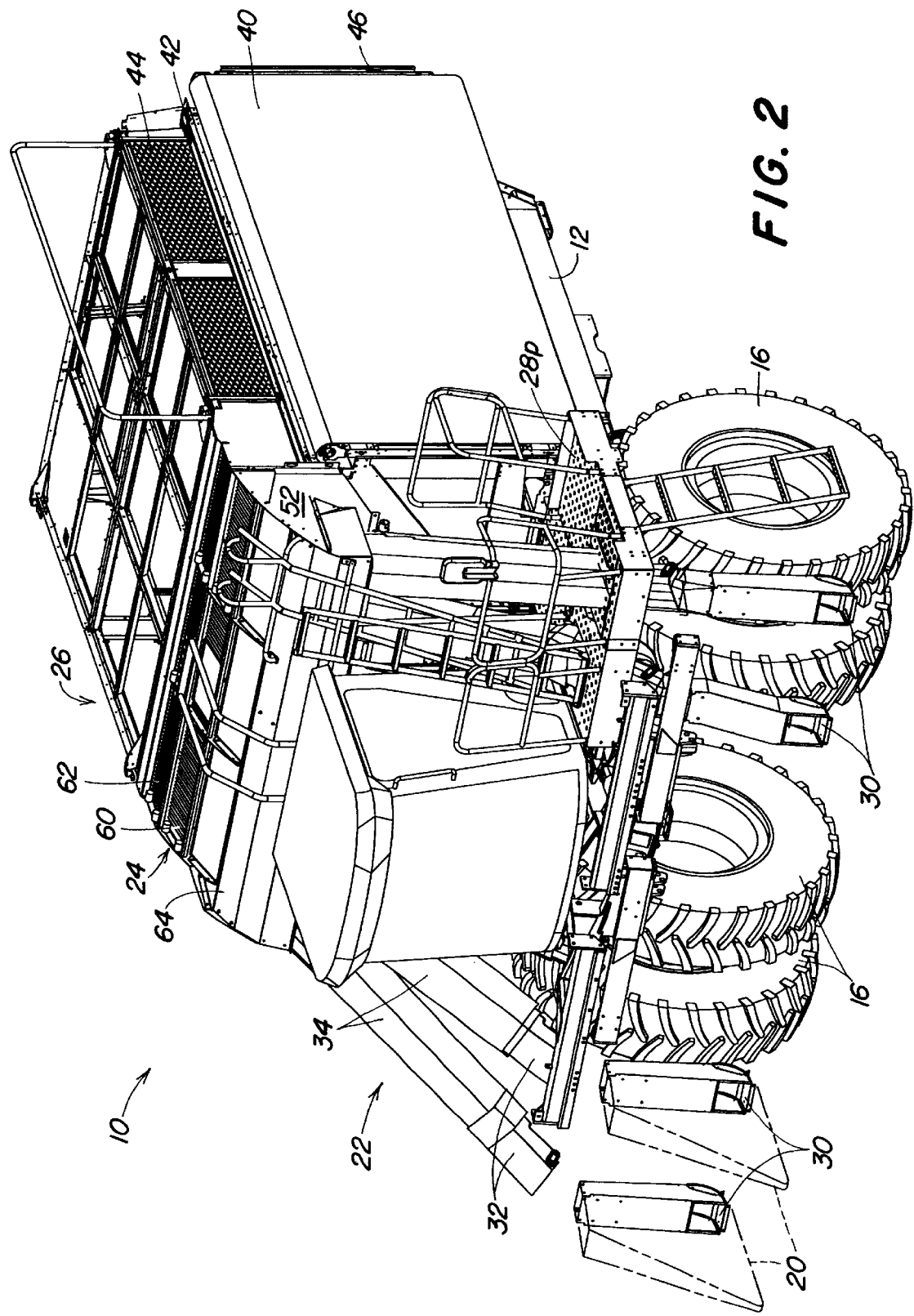
FIG. 2 is a view similar to FIG. 1 but showing the basket and ducts lowered to a transport position.
Figure 3:
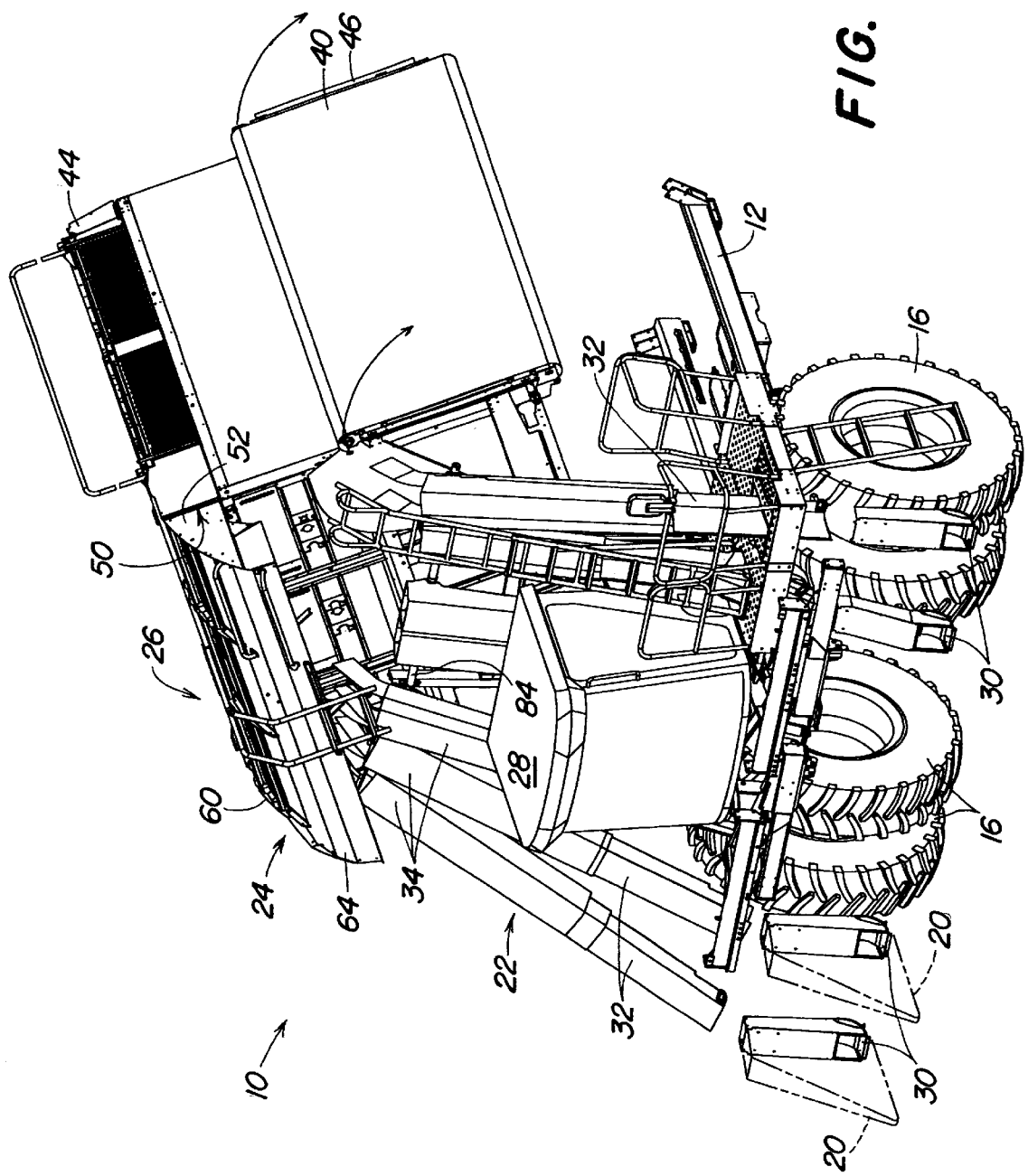
FIG. 3 is a perspective view of the harvester of FIG. 1 with the basket raised for dumping.

Referring now to FIGS. 1–3, therein is shown a cotton harvester 10 having a main frame 12 supported for forward movement over a field of cotton plants by forward drive wheels 16 and rear steerable wheels (not shown). The harvester 10, with the exception of the improved duct support and transition structure described below, may be generally of the type exemplified by the John Deere Model 9976 Cotton Picker. The harvester 10 includes row units 20 supported from the forward end of the frame 12 for removing cotton from the plants. Removed crop is directed upwardly and rearwardly through an air duct system 22 and hood and grate structure 24 to a telescoping cotton basket or receptacle 26 located behind a harvester cab 28 and platform 28p.

Figure 4:
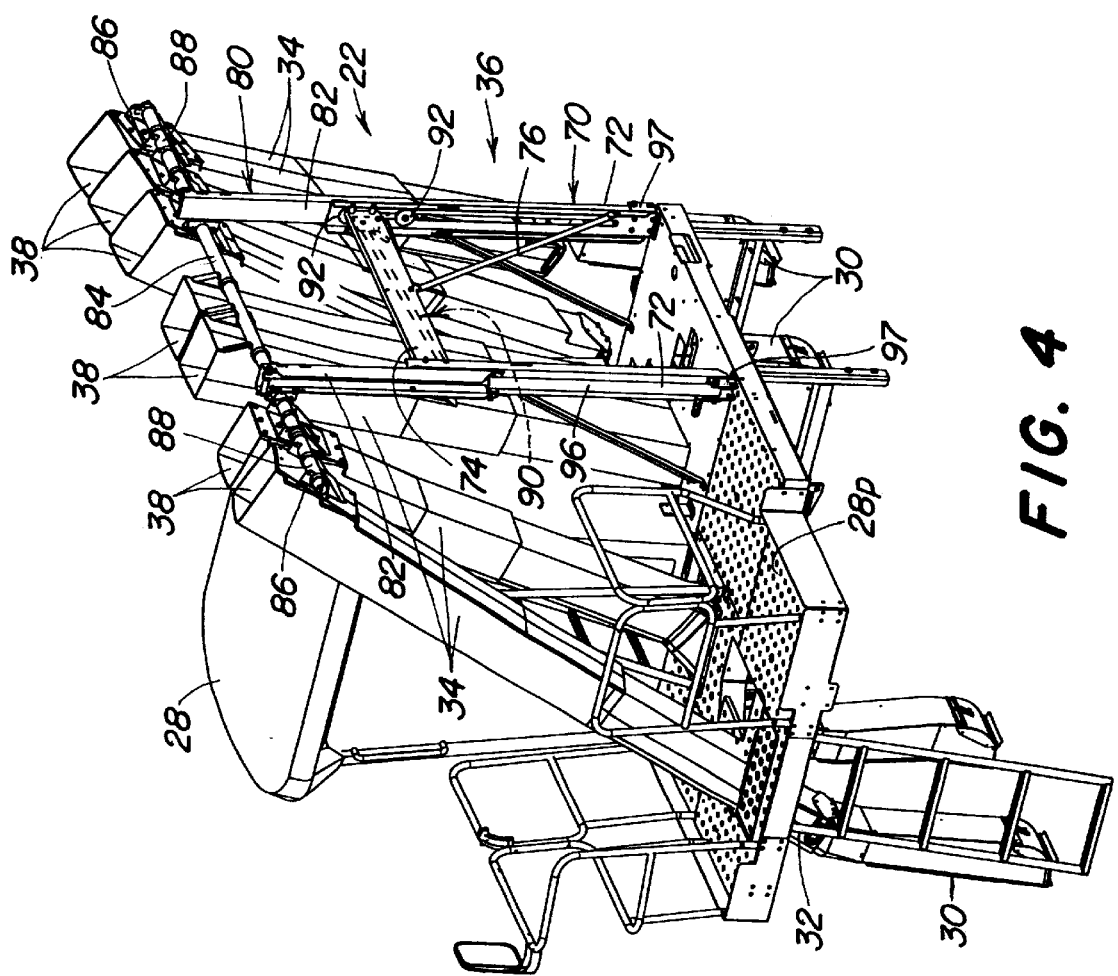
FIG. 4 is an enlarged rear perspective view of the duct support structure for the harvester of FIG. 1.

The row units 20 include rear suction door structure 30 connected to lower duct sections 32 which extend upwardly and rearwardly to a telescoping connection with upper duct sections 34. The sections 34 are supported for vertical movement relative to the lower duct sections 32 by duct support structure indicated generally at 36 in FIG. 4. The structure 36 is operable to move the upper duct sections 34 between a lowered transport position (FIG. 2), wherein the lower portions of the sections 34 are extended downwardly over the sections 32 to a location generally at the level of the cab platform 28p and upwardly opening outlets 38 are at approximately cab height, and a fully extended or field working position (FIGS. 1, 3 and 4). In the field working position, the upwardly opening duct outlets 38 are located a substantial distance above the top of the cab 28. As can best be seen in FIGS. 3 and 4, the outlets 38 open freely upwardly so that the primary direction of cotton and debris flow at the ends of the ducts is upward and egress from the ducts is unimpeded.

The basket 26 includes a main lower basket portion 40 and a second section 42 telescopingly received within the portion 40. A shorter upper lid extension 44 and the hood structure 24 is assembled in position on the section 42 after the harvester 10 is shipped from the factory and received by an implement dealer or operator. The basket 26 is pivotal hydraulically in a conventional manner about a fore-and-aft extending axis (FIG. 3) near the right side of the harvester to raise the left side of the basket. A dump side conveyor door 46 is pivoted downwardly from the lower left side of the basket 26 to unload the cotton into a receiver such as a boll buggy or cotton compactor. A pivoting basket 26 is shown by way of example only, and it is to be understood that the duct and transition structure of the present invention may also be used with other types of baskets and basket dump structures. The section 42 may be moved downwardly into a transport position (FIG. 2) relative to the lower basket portion 40 by releasing reset latches (not shown) and retracting three series connected hydraulic basket cylinders 48, as described in further detail below. The cylinders 48 include two transversely spaced at the forward end of the basket and one centered at the rear of the basket.

The forward end of the extension 44 includes a rectangular opening 50 having a width approximately equal to that of the basket 26 and a height approximately equal to the height of the extension 44. The remainder of the basket 26 is generally closed by conventional panel and mesh structure. The aft end of the hood structure 24 is connected to the forward end of the basket 26 and opens rearwardly into the basket opening 50 and downwardly towards the upper duct outlets 38. The hood structure 24, which extends transversely between end panels 52 projecting forwardly from the sides of the extension 44, provides a transition zone between the upwardly opening duct sections 34 and the forwardly directed basket opening 50 independently of any additional shields or panels projecting forwardly from the basket. When the basket 26 is moved from the harvest position toward the dump position shown in FIG. 3, the hood structure 24 is freely movable away from the upper end portions of the duct sections 34. The hood structure 24 and the opening 50 extend across a substantial portion of the basket width to provide a relatively open area between the upper end portions and the receptacle opening through a cross-sectional area greater than a combined cross-sectional area of the outlets 38 so that cotton delivery is relatively unimpeded.

To facilitate exhausting of fine debris and air, the hood structure 24 includes two rows of grates 60 and 62 extending transversely across the width of the basket 26 rearwardly of forward transversely extending panel structure 64. The trajectory of the air from the upwardly opening outlets 38 hitting the grates 60 and 62 provides more positive trash removal from the flow of cotton passing through the transition zone between the outlets 38 and the opening 50 than available with conventional units having more rearwardly directed outlets. Additional grate crosssectional area is also provided by the extension of the grates over the basket width. The panel structure 64 may be replaced with grate structure when the operator desires additional debris removal aggressiveness.

To move the duct sections vertically between the transport and field working positions, the duct support structure 36 includes a lift frame 70 (FIG. 4) having a pair of slotted channel-shaped side legs 72 extending vertically from the platform 28p in parallel relationship and connected near their upper ends by a cross member 74. Diagonal cross braces 76 lend strength and lateral stability to the frame 70. A sliding support assembly 80 includes a pair of channel-shaped members 82 received by the side legs 72. An elongated tubular member 84 connects the upper ends of the members 82. The member 84 extends transversely between the outermost duct sections 34, and brackets 86 pivotally connect upper rear portions of the duct sections with the tubular member 84 to provide support and lateral stability for the sections. Collars 88 located on the tubular support member 84 between adjacent brackets for a duct section limit transverse movement of the sections relative to the member. Reset latch structure indicated generally at 90 in FIG. 4 releasably secures the sliding support assembly 80 in a raised position.

Figure 5:
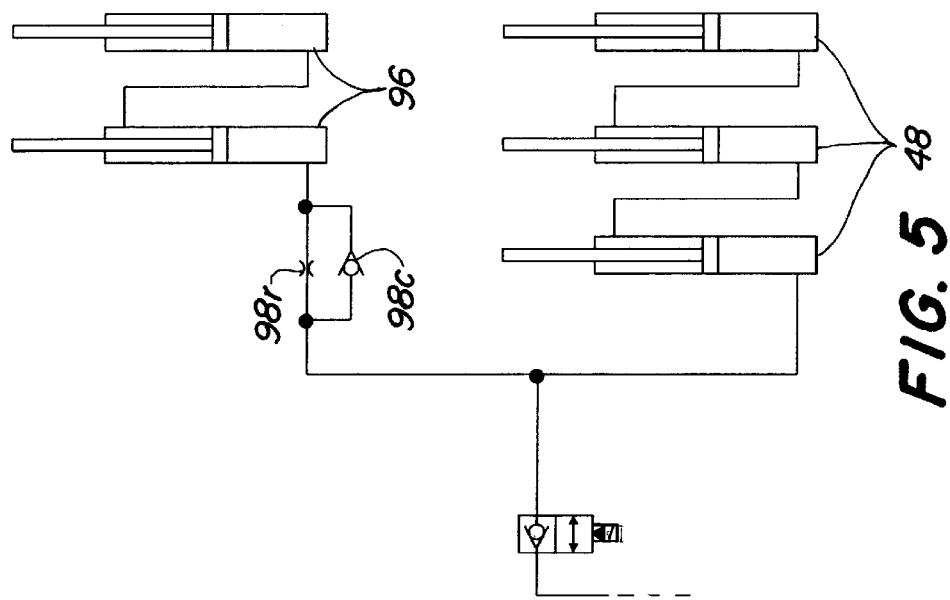
FIG. 5 is a schematic of the hydraulic lift circuit for the harvester of FIG. 1.

Bolt and washer assemblies 92 are connected to the members 82 and extend through the slots in the side legs 72 to maintain the members 82 in alignment with the side legs 72 while permitting relative sliding movement between the members and side legs. The reset latch structure 90 contacts the upper bolt and washer assemblies 92 when the support assembly 80 is extended and supports the weight of the duct structure during operation. Series connected hydraulic cylinders 96 are generally contained within the channel-shaped legs 72 and members 82 and include base ends connected to platform brackets 97 which also support the bottom ends of the side legs 72 from the platform 28p. The rod ends of the cylinders 96 are connected to the tops of the members 82. The two series connected duct lift cylinders 96 are plumbed in parallel with the three series connected basket cylinders 48 (FIG. 5). The hydraulic circuit for the cylinders 48 and 96 includes orifice structure 98r restricting extension of the duct lift cylinders 96 so the ducts lift more slowly towards the field working position than the basket section 42. A check valve 98c is connected in parallel with the orifice structure 98r. Upon retraction of the cylinders 48 and 96 to move the structure to the transport position, the heavier basket section 42 lowers more quickly than the duct support assembly 80, and the hood structure 24 contacts the tubular member 84 to urge the duct sections 34 downwardly generally in unison with the telescoping of the basket 26. The check valve 98c provides relatively free flow of hydraulic fluid from the cylinders 96 back to sump during lowering of the ducts.

When the operator desires to lower the basket 26 to a retracted transport position, the cylinder circuit is pressurized to extend the five cylinders 48 and 96 to thereby remove weight from the basket latches and duct reset latch structure 90. The latches are then released, and the basket section 42 is telescoped into the main basket portion 40 (FIG. 2). The duct sections are urged downwardly by the contact of the hood structure 24 with the member 84. When the basket is fully retracted, the outlets 38 are approximately level with the top of the cab 28, and the latches latch structure 90 are reset so they will automatically latch when the basket and ducts are moved back to the field working position.

To move the basket 26 back to the working position, the operator extends the basket cylinders 48 until the section 42 is fully raised and the basket latches move into the locked position. As the cylinders 48 extend, the cylinders 96 are extended at a slower rate than the cylinders 48 because of the orifice structure 98r to move the outlets 38 into the hood structure 24. The latch structure 90 automatically secures the duct support assembly 80 in the fully extended position.

Having described the preferred embodiment, it will become apparent that various modifications can be made without departing from the scope of the invention as defined in the accompanying claims.

What is claimed is:

1. A harvester having a frame and including row units supported by the frame for removing crop from plants, a receptacle having a harvest position for receiving the crop and a raised dump position for unloading the crop, an air duct system including a plurality of upright ducts extending upwardly from the row units and receiving the removed crop, an air system for propelling the removed crop upwardly through the air ducts towards the receptacle, the upright ducts including outlet portions having an outlet cross-sectional area and opening upwardly, and wherein the receptacle has sides defining an operating width and includes a forward receptacle opening, hood structure connected to the receptacle adjacent the receptacle opening, the hood structure opening rearwardly into the receptacle opening and extending over and opening downwardly over the outlet portions in crop receiving relationship thereto when the receptacle is in the harvest position, the hood structure generally freely movable away from the upper end portions when the receptacle is moved from the harvest position toward the dump position, wherein the opening and the hood structure extend generally continuously the entire operating width to provide crop flow through a cross-sectional area substantially greater than the outlet cross-sectional area.

2. The harvester as set forth in claim 1 further comprising duct lift structure supporting the upright ducts for movement between an uppermost harvest position and a lowered transport position, the duct structure freely movable downwardly relative to the hood structure from a raised operating position to a retracted transport position.

3. The harvester as set forth in claim 2 wherein the duct structure includes upper duct portions telescopingly received by lower duct portions, and the duct lift structure comprises an elongated connecting member supporting the upper duct portions and non-pivotally moving the upper duct portions vertically between raised field working and lowered transport positions, and wherein the hood is fixed to the receptacle.

4. The harvester as set forth in claim 3 further comprising an hydraulically operated sliding assembly supporting the elongated connecting member for movement of the upper duct portions in unison between the field working and transport positions.

5. The harvester as set forth in claim 3 wherein the duct lift structure defines a substantially linear path of travel for elongated connecting member thereby facilitating non-pivotal telescoping of the upper duct portions relative to the lower duct portions free of binding.

6. The harvester as set forth in claim 1 wherein the hood structure defines a transition zone for propelled crop directing the crop rearwardly from the outlet portions towards the receptacle opening, the transition zone including cleaning grate structure extending the preselected operating width.

7. The harvester as set forth in claim 1 wherein the receptacle opening extends generally across the operating width and provides unrestricted crop flow between the upper end portions and the receptacle opening through a cross-sectional area greater than a combined cross-sectional area of the upper end portions.

8. The harvester as set forth in claim 1 wherein the hood structure comprises debris separating structure extending continuously between the sides generally the entire operating width.

9. A harvester having a frame and including row units supported by the frame for removing crop from plants, a receptacle having a harvest position for receiving the crop and a raised dump position for unloading the crop, an air duct system including a plurality of upright ducts extending upwardly from the row units and receiving the removed crop, an air system for propelling the removed crop upwardly through the air ducts towards the receptacle, the upright ducts including outlet portions opening upwardly, and wherein the receptacle includes a forward receptacle opening, hood structure connected to the receptacle adjacent the receptacle opening, the hood structure opening rearwardly into the receptacle opening and extending over and opening downwardly over the outlet portions in crop receiving relationship thereto when the receptacle harvest position, the hood structure generally freely movable away from the outlet portions when the receptacle is moved from the harvest position toward the dump position; duct lift structure supporting the upright ducts for movement between an uppermost harvest position and a lowered transport position, the duct structure freely movable downwardly relative to the hood structure from a raised operating position to a retracted transport position; wherein the duct structure includes upper duct portions telescopingly received by lower duct portions, and the duct lift structure comprises an elongated connecting member supporting the upper duct portions and positively moving the upper duct portions vertically between raised field working and lowered transport positions; wherein the duct lift structure defines a substantially linear path of travel for elongated connecting member thereby facilitating telescoping of the upper duct portions relative to the lower duct portions free of binding; and wherein the duct lift structure comprises a lift frame extending vertically from the harvester frame, a sliding support slidably supported by the lift frame and carrying the connecting member, and first and second hydraulic cylinders connected to the sliding support and moving the support vertically along the lift frame.

10. A harvester having a frame and including row units supported by the frame for removing crop from plants, a receptacle with spaced side walls defining a receptacle width having a harvest position for receiving the crop and a raised dump position for unloading the crop, an air duct system including a plurality of upright ducts extending upwardly from the row units and receiving the removed crop, an air system for propelling the removed crop upwardly through the air ducts towards the receptacle, the upright ducts including outlet portions opening upwardly, and hood structure extending continuously between the walls generally the entire receptacle width, the hood structure opening into the receptacle and extending forwardly from the receptacle over the outlet portions in crop receiving relationship thereto when the receptacle is in the harvest position, a movable duct support connected to the upright ducts and moving the outlet portions between a raised operating position wherein, when the receptacle is in the harvest position, the outlet portions open into the hood in cotton conveying relationship thereto, and a transport position wherein the outlet portions are lowered from the operating position to thereby reduce transport height of the upright ducts.

11. The harvester as set forth in claim 10 wherein the upright ducts comprise telescoping sections including upper sections defining the outlet portions, the movable duct support includes an elongated support member extending between and connected to the upper sections, and cylinder structure connected to the elongated support and moving the upper sections generally in unison between the raised position and the transport position.

12. The harvester as set forth in claim 11 wherein the cylinder structure moves the upper sections along a generally upright linear path.

13. The harvester as set forth in claim 10 wherein the hood structure is freely movable away from the outlet portions with movement of the receptacle to the dump position.

14. The harvester as set forth in claim 10 wherein the hood structure includes a debris separating portion located above the outlet openings and extending generally uninterrupted over the receptacle width between the walls.

15. A harvester having a frame and including row units supported by the frame for removing crop from plants, a receptacle having a harvest position for receiving the crop and a raised dump position for unloading the crop, an air duct system including a plurality of upright ducts extending upwardly from the row units and receiving the removed crop, an air system for propelling the removed crop upwardly through the air ducts towards the receptacle, the upright ducts including outlet portions opening upwardly, and hood structure opening into the receptacle and extending forwardly from the receptacle over the outlet portions in crop receiving relationship thereto when the receptacle is in the harvest position, a movable duct support connected to the upright ducts and moving the outlet portions between a raised operating position wherein, when the receptacle is in the harvest position, the outlet portions open into the hood in cotton conveying relationship thereto, and a transport position wherein the outlet portions are located lowered from the operating position to thereby reduce transport height of the upright ducts; wherein the hood structure includes a debris separating portion located above the outlet openings; and wherein the debris separating portion includes panel structure and grate structure located above the outlet portions.

16. A harvester having a frame and including row units supported by the frame for removing crop from plants, a receptacle having a harvest position for receiving the crop and a raised dump position for unloading the crop, an air duct system including a plurality of upright ducts extending upwardly from the row units and receiving the removed crop, an air system for propelling the removed crop upwardly through the air ducts towards the receptacle, the upright ducts including outlet portions opening upwardly, and hood structure opening into the receptacle and extending forwardly from the receptacle over the outlet portions in crop receiving relationship thereto when the receptacle is in the harvest position, a movable duct support connected to the upright ducts and moving the outlet portions between a raised operating position wherein, when the receptacle is in the harvest position, the outlet portions open into the hood in cotton conveying relationship thereto, and a transport position wherein the outlet portions are located lowered from the operating position to thereby reduce transport height of the upright ducts; wherein the hood structure includes a debris separating portion located above the outlet openings; and wherein the debris separating portion extends generally uninterrupted between the outlet portions and has a total debris separating width substantially greater than a combined width of the upright ducts.

17. A harvester having a frame and including harvesting structure supported by the frame for removing crop from plants, a telescoping receptacle having an extended harvest position for receiving the crop and a lowered transport system, an air duct system including upright duct structure extending upwardly from the harvesting structure and receiving the removed crop, an air system for propelling the removed crop upwardly through the duct structure towards the receptacle, wherein the telescoping receptacle includes a lower basket portion, a middle section telescopingly received by the lower basket portion and movable between lowered and raised positions, an upper lid extension connected to the middle section and including a forwardly opening input area and sides extending rearwardly from the input area, a hood extending generally continuously between the sides substantially the width of the basket and connected to the upper lid extension, the hood opening rearwardly into the forward opening and downwardly at a location forwardly adjacent the receptacle, and wherein the duct structure includes telescoping ducts having ends freely received within the hood, the hood providing a transition area extending generally uninterruptedly between the ducts and the input area, the transition area generally closed to the egress of removed crop independently of direct connection of the duct structure to the receptacle or shields so that the relative movement between the ducts and the receptacle is facilitated.

18. The harvester as set forth in claim 17 wherein the receptacle is movable between a field working position and a raised dump position, the ducts include outlet portions opening upwardly, and the hood-opens over the outlet portions in crop receiving relationship thereto when the receptacle is in the field working position.

19. The harvester as set forth in claim 17 including a movable duct support connected to the telescoping ducts and moving the telescoping ducts between a raised operating position wherein the ends open into the hood and a transport position wherein the outlet portions are lowered from the operating position to thereby reduce transport height of the upright ducts.

20. A harvester having a frame and including harvesting structure supported by the frame for removing crop from plants, a telescoping receptacle having an extended harvest position for receiving the crop and a lowered transport system, an air duct system including upright duct structure extending upwardly from the harvesting structure and receiving the removed crop, an air system for propelling the removed crop upwardly through the duct structure towards the receptacle, wherein the telescoping receptacle includes a lower basket portion, a middle section telescopingly received by the lower basket portion and movable between lowered and raised positions, an upper lid extension connected to the middle section and including a forwardly opening input area, a hood extending substantially the width of the basket and connected to the upper lid extension, the hood opening rearwardly into the forward opening and downwardly at a location forwardly adjacent the receptacle, and wherein the duct structure includes telescoping ducts having ends freely received within the hood, the hood providing a transition area between the ducts and the input area generally closed to the egress of removed crop independently of direct connection of the duct structure to the receptacle or shields so that the relative movement between the ducts and the receptacle is facilitated; and wherein the hood comprises side panels extending forwardly from sides of the upper lid extension, and grate structure extending between panels generally the width of the receptacle.

21. A harvester having a frame and including harvesting structure supported by the frame for removing crop from plants, a telescoping receptacle having an extended harvest position for receiving the crop and a lowered transport system, an air duct system including upright duct structure extending upwardly from the harvesting structure and receiving the removed crop, an air system for propelling the removed crop upwardly through the duct structure towards the receptacle, wherein the telescoping receptacle includes a lower basket portion, a middle section telescopingly received by the lower basket portion and movable between lowered and raised positions, an upper lid extension connected to the middle section and including a forwardly opening input area, a hood extending substantially the width of the basket and connected to the upper lid extension, the hood opening rearwardly into the forward opening and downwardly at a location forwardly adjacent the receptacle, wherein the duct structure includes telescoping ducts having ends freely received within the hood, the hood providing a transition area between the ducts and the input area generally closed to the egress of removed crop independently of direct connection of the duct structure to the receptacle or shields so that the relative movement between the ducts and the receptacle is facilitated, and a movable duct support connected to the telescoping ducts and moving the telescoping ducts between a raised operating position wherein the ends open into the hood and a transport position wherein the outlet portions are lowered from the operating position to thereby reduce transport height of the upright ducts, and further including a basket lift cylinder for telescoping the middle section relative to the lower basket portion, and a duct lift cylinder connected to the movable duct support for telescoping the ducts to move the ends vertically, and a hydraulic circuit connecting the basket lift cylinder and the duct lift cylinder for operation in parallel, the hydraulic circuit including structure causing the ducts to telescope upwardly more slowly than the telescoping of the middle section.

22. The harvester as set forth in claim 21 wherein the hood contacts the duct support to urge the duct support downwardly as the middle section is telescoped downwardly.

* * * * *